(12) United States Patent
Queant et al.

(10) Patent No.: US 10,786,877 B2
(45) Date of Patent: Sep. 29, 2020

(54) REPAIR OF AN ASSEMBLY COMPRISING A MAIN BODY AND A REINFORCEMENT

(71) Applicant: SAFRAN AIRCRAFT ENGINES, Paris (FR)

(72) Inventors: Didier Queant, Moissy-Cramayel (FR); Dominique Magnaudeix, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/506,924

(22) PCT Filed: Aug. 20, 2015

(86) PCT No.: PCT/FR2015/052242
§ 371 (c)(1),
(2) Date: Feb. 27, 2017

(87) PCT Pub. No.: WO2016/030614
PCT Pub. Date: Mar. 3, 2016

(65) Prior Publication Data
US 2017/0274485 A1    Sep. 28, 2017

(30) Foreign Application Priority Data

Aug. 28, 2014  (FR) ..................................... 14 58072

(51) Int. Cl.
*B23P 6/00* (2006.01)
*B21J 15/50* (2006.01)
(Continued)

(52) U.S. Cl.
CPC ............... *B23P 6/005* (2013.01); *B21J 15/02* (2013.01); *B21J 15/50* (2013.01); *B23P 6/00* (2013.01);
(Continued)

(58) Field of Classification Search
CPC ............ B23P 6/005; B21J 15/50; B29C 73/06
See application file for complete search history.

(56) References Cited

U.S. PATENT DOCUMENTS 3,526,032 A * 9/1970 Pipher ....................... B21J 15/02
                                                        29/509
4,048,708 A * 9/1977 Briles ....................... B21J 15/02
                                                        29/509
(Continued)

FOREIGN PATENT DOCUMENTS

CN       101140006 A    3/2008
CN       101437645 A    5/2009
(Continued)

OTHER PUBLICATIONS

International Search Report dated Dec. 14, 2015 in PCT/FR2015/052242 filed Aug. 20, 2015.

(Continued)

*Primary Examiner* — Christopher M Koehler
*Assistant Examiner* — Kyle A Cook
(74) *Attorney, Agent, or Firm* — Oblon, McClelland, Maier & Neustadt, L.L.P.

(57) ABSTRACT

A repair method for repairing an assembly including a main body and an old reinforcement, the assembly including an initial hole passing through the old reinforcement and at least a portion of the main body, the method including removing the old reinforcement; positioning a plug in the initial hole in the main body; fastening a new reinforcement on the main body, the new reinforcement covering the plug; and forming a new hole passing through the new reinforcement and at least a portion of the main body.

10 Claims, 1 Drawing Sheet

(51) Int. Cl.
*B29C 73/06* (2006.01)
*F01D 5/00* (2006.01)
*B21J 15/02* (2006.01)
*F01D 5/14* (2006.01)
*F16B 5/04* (2006.01)
*F01D 5/28* (2006.01)
*B23P 6/04* (2006.01)

(52) U.S. Cl.
CPC .............. *B23P 6/045* (2013.01); *B29C 73/06* (2013.01); *F01D 5/005* (2013.01); *F01D 5/147* (2013.01); *F01D 5/282* (2013.01); *F16B 5/04* (2013.01); *B23P 6/002* (2013.01); *B23P 6/04* (2013.01); *F05D 2220/36* (2013.01); *F05D 2230/64* (2013.01)

(56) References Cited

U.S. PATENT DOCUMENTS

| | | | |
|---|---|---|---|
| 4,738,594 A | | 4/1988 | Sato et al. |
| 4,944,655 A | * | 7/1990 | Merz ................ B64C 11/26 |
| | | | 416/146 R |
| 4,984,347 A | | 1/1991 | Cox |
| 5,314,282 A | * | 5/1994 | Murphy ............ B29C 53/562 |
| | | | 244/132 |
| 5,722,144 A | | 3/1998 | Bora |
| 5,785,498 A | * | 7/1998 | Quinn ................ F01D 5/14 |
| | | | 416/224 |
| 6,843,928 B2 | * | 1/2005 | Cline ................ C23F 1/26 |
| | | | 216/100 |
| 2008/0099446 A1 | | 5/2008 | Belanger |
| 2009/0208691 A1 | * | 8/2009 | Whitworth ............ B23P 6/00 |
| | | | 428/63 |
| 2011/0024398 A1 | | 2/2011 | Belanger |
| 2011/0031223 A1 | | 2/2011 | Belanger |
| 2011/0186206 A1 | | 8/2011 | Ackerman et al. |
| 2012/0189807 A1 | | 7/2012 | Whitworth et al. |
| 2012/0205031 A1 | | 8/2012 | Ackerman et al. |

FOREIGN PATENT DOCUMENTS

| | | |
|---|---|---|
| DE | 42 25 599 A1 | 2/1994 |
| DE | 43 20 068 C1 | 12/1994 |
| EP | 1 916 051 A1 | 4/2008 |
| JP | 10-156633 A | 6/1998 |
| RU | 2417869 C2 | 5/2011 |
| RU | 2456460 C2 | 7/2012 |
| WO | 2007/133198 A1 | 11/2007 |

OTHER PUBLICATIONS

Combined Chinese Office Action and Search Report dated Jul. 27, 2018 in Patent Application No. 201580046467.2 (submitting English language translation only).

Russian Office Action issued in Russian Application No. 2017109964 dated Jun. 20, 2019 citing documents AO-AP therein (English Translation).

* cited by examiner

REPAIR OF AN ASSEMBLY COMPRISING A MAIN BODY AND A REINFORCEMENT

FIELD OF THE INVENTION

The present description relates to the field of fabricating parts, and more particularly to a method of repairing an assembly comprising a main body and reinforcement.

TECHNOLOGICAL BACKGROUND

Parts are known that are made up of a plurality of portions, for example turbine engine airfoil elements comprising a main body made of composite material and metal reinforcement. While the airfoil element is in use in operation, or during stages of production, the reinforcement can suffer wear or damage while the main body is protected. It can thus be advantageous, both in maintenance and in production to be able to replace the reinforcement while conserving the original main body.

In order to avoid weakening the main body, it is preferable to reuse the fastener elements (e.g. a rivet hole, tapping, etc.) that are already provided in the main body. Nevertheless, such an operation requires the positions of such fastener elements to be identified exactly on the new reinforcement. In practice, such identification is often approximate, and making use of fastener elements that are shifted, even if only a little, weakens the structure of the main body. For example, forming a new hole through the assembly that does not coincide exactly with the old hole has the effect of making the old hole oval, thereby compromising the effectiveness of its function (with this applying both to a tapped hole and to a rivet hole). There thus exists a need for a method of repairing such an assembly.

SUMMARY OF THE INVENTION

To this end, the present description relates to a repair method for repairing an assembly comprising a main body and an old reinforcement, the assembly including an initial hole passing through the old reinforcement and at least a portion of the main body, the method comprising:

removing the old reinforcement;

positioning a plug in the initial hole in the main body;

fastening a new reinforcement on the main body, the new reinforcement covering the plug; and forming a new hole passing through the new reinforcement and at least a portion of the main body.

In such a method, the terms "old" (or "initial") and "new" refer to the order in which two reinforcements are installed on the main body when implementing the method. These terms say nothing about the use that is made otherwise of these reinforcements or of their good or poor state, or indeed of their wear. In addition, the new reinforcement may be similar to the old reinforcement, which means that the new reinforcement is substantially identical to the new reinforcement as it was originally. The old and new reinforcements need not be identical, in particular because the old reinforcement includes a hole where the new reinforcement does not, specifically at the location where it is desired to form a hole. Furthermore, in a context of maintenance and/or repair, the old reinforcement may be deformed, e.g. as a result of wear or damage, while the new reinforcement may be of a shape that is somewhat different.

Likewise, the initial hole is the hole that was present prior to plugging with the plug, and the new hole is the hole that is formed after plugging with the plug.

The new reinforcement may be fastened by adhesive, for example. The new hole may be formed by drilling, for example. The reinforcement may be reinforcement that is external to the main body, e.g. made of sheet metal.

If the initial hole is not plugged and if the new hole is formed close to the initial hole but without both holes coinciding exactly, then the new hole will be larger than desired. For example, forming a cylindrical hole that partially overlaps another cylindrical hole gives rise to a hole of section that is substantially oval; unfortunately, this is not desirable, in particular when the hole contributes to a fastening for which the shape of the hole is important (e.g. a tapped hole, a rivet hole, etc.). In contrast, the above method makes it possible to avoid any ovalization and to ensure that the new hole does indeed have the shape that it is desired to give it.

Furthermore, the method is simple to perform and is entirely generic, thus making it suitable for application to a wide variety of assemblies and shapes.

In certain implementations, the method includes fastening the plug to the main body prior to fastening the new reinforcement. The plug may be fastened to the main body by adhesive or by any other appropriate technique. In this way, the plug is held more securely to the main body than if it were held merely by friction or by the new reinforcement covering it. In particular, the plug can be fastened in the hole. The plug may be fastened by adhesive or by any other appropriate fastener means.

In certain implementations, the method comprises leveling the plug before fastening the new reinforcement, such that the plug is flush with the surface of the main body in which it lies. Such a step presents two advantages: firstly, the new reinforcement can thus be fastened as close as possible to said surface of the main body. Secondly, it is possible to mass-produce the plugs, all having the same shape, without matching their lengths to the shapes of the old holes in which they are to be positioned.

In certain implementations, the new hole is formed at least in part in the plug. The structure of the main body is thus weakened less by forming the new hole. Furthermore, the material of the plug is thus of reduced importance since the plug is replaced in part by the new hole.

In certain implementations, the method further comprises riveting the assembly after forming the new hole in the assembly. In such implementations, the importance of having a hole that has not been ovalized is particularly clear: if the hole is ovalized, there is clearance around the rivet and the rivet does not hold the assembly together in satisfactory manner.

Furthermore, when the new hole is formed in the plug but not exactly in its location, there remain portions of the plug in the assembly after the new hole has been formed and the assembly has been riveted. The remaining portions of the plug serve advantageously as a bushing and/or washer for the rivet. Said rivet may also itself include a bushing and/or a washer.

In certain implementations, the initial hole in the main body presents a shape that flares towards the reinforcement, and the plug comprises a frustoconical portion. Saying that the initial hole is of a shape that flares towards the reinforcement means that the initial hole in the main body is of greater section beside the reinforcement than beside the main body (at least over a segment of said hole). The characteristics of these implementations are particularly adapted to using the hole for fastening reinforcement by riveting. In addition, the frustoconical portion of the plug can easily adapt to the flared shape of the initial hole, thereby making it easier to fit the plug.

In certain implementations, the plug has mechanical properties of the same order of magnitude as the mechanical properties of the main body. Saying that two quantities are of the same order of magnitude means that they differ from each other by no more than a factor of ten, as is commonly accepted scientifically. The mechanical properties in question may be selected from the group containing: strength, hardness, ductility, rigidity, toughness, Young's modulus, coefficient of thermal expansion, and magnitudes obtained by calculation from the above.

The present description also relates to a repair method for repairing an assembly comprising a main body, a first old reinforcement and a second old reinforcement, the two old reinforcements being arranged on either side of the main body, the assembly including an initial hole passing through the main body and the two old reinforcements, the method comprising replacing the first old reinforcement using the repair method as described above, replacing the second old reinforcement using the repair method as described above, and wherein the holes are formed in the two new reinforcements in such a manner that the hole in the first new reinforcement and the hole in the second new reinforcement are in communication.

In such a method, replacing the first old reinforcement using the above-described method involves a new reinforcement that is referred to as the first new reinforcement, with a first hole being formed beside it (hole beside the new reinforcement). Likewise, replacing the second old reinforcement using the above-described method involves a new reinforcement that is referred to as the second new reinforcement, beside which a second hole is formed (hole beside the second new reinforcement). The first new reinforcement and the second new reinforcement may be constituted by a single part, which thus surrounds the main body, at least in part.

In certain implementations, after positioning the first plug and the second plug, the first plug and the second plug are spaced apart from each other. In other words, the first and second plugs are positioned in such a manner as to leave a space between the plugs. The first plug is the plug used for replacing the first old reinforcement, and the second plug is the plug used for replacing the second old reinforcement.

The space left between the plugs ensures that the plugs do not push against each other in the event of differential expansion between the main body and the plugs. Contact between the plugs could lead to the hole becoming unplugged.

The present description also relates to a repair method for repairing an assembly comprising a main body, a first old reinforcement and a second old reinforcement, the two old reinforcements being arranged on either side of the main body, the assembly including an initial hole passing through the main body and the two old reinforcements, the method comprising:

removing the old reinforcement;

positioning a first plug in a first end of the initial hole in the main body;

fastening a first new reinforcement on the first side of the main body, the first new reinforcement covering the first plug;

positioning a second plug at a second end of the initial hole in the main body;

fastening a second new reinforcement on the second side of the main body, the second new reinforcement covering the second plug; and forming a new hole passing through the first new reinforcement, the second new reinforcement, and the main body.

BRIEF DESCRIPTION OF THE DRAWING

The invention and its advantages can be better understood on reading the following detailed description of implementations of the invention given as non-limiting examples. The description refers to the accompanying drawing, in which.

DETAILED DESCRIPTION OF THE INVENTION

Figure 1:
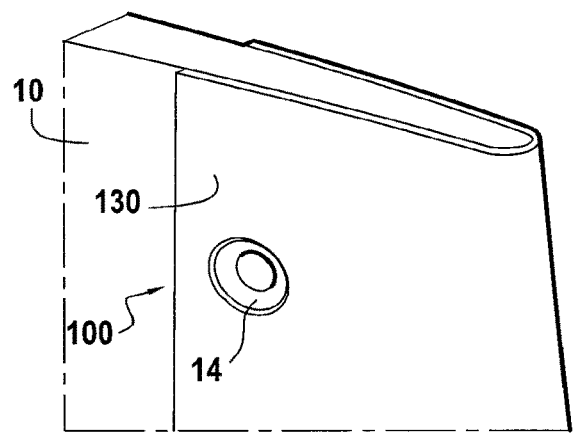
FIG. 1 is a perspective view showing an assembly having an initial hole.

FIG. 1 is a perspective view of an assembly 100 comprising a main body 10 and an old reinforcement 130. In the example, the assembly 100 is an airfoil element of a turbine engine. For example, the main body 10 may be made of composite material. The old reinforcement 130 may be made of metal. The old reinforcement 130 is installed on the main body 10 as external reinforcement covering a portion of the main body 10.

A hole (an initial hole) 12 passes through the old reinforcement 130 and at least part of the main body 10. In the implementation shown, the hole 12 is a through hole. Nevertheless, the invention applies equally to a hole that is not a through hole (a blind hole).

In the implementation described, the hole 12 is a rivet hole, i.e. a hole that is to receive a rivet. In a variant, the hole 12 could be a tapped hole, or any type of hole.

Figure 2:
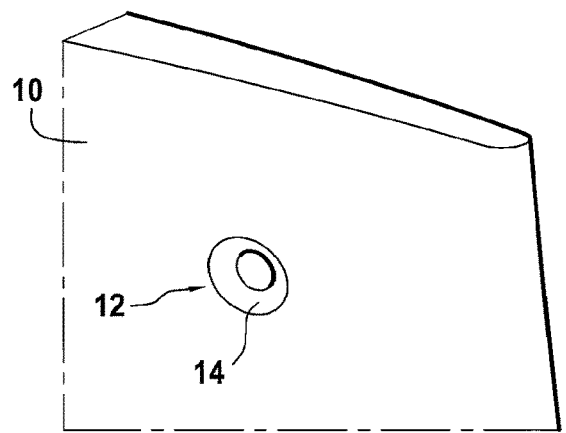
FIG. 2 is a perspective view showing the FIG. 1 assembly from which the reinforcement has been removed.

FIG. 2 is a perspective view showing the assembly 100 from which the old reinforcement 130 has been removed. FIG. 2 shows the main body 10 with the hole 12. In the present implementation, the initial hole 12 is flared at its ends (only one flared end 14 is visible in FIG. 2).

Removing the old reinforcement 130 in order to reach the situation shown in FIG. 2 constitutes a step of the repair method in a first implementation. The following steps are described in detail with reference to FIGS. 3A to 3E, which are various section views showing the assembly 100 at successive stages in the repair method of the present implementation.

Figure 3A:
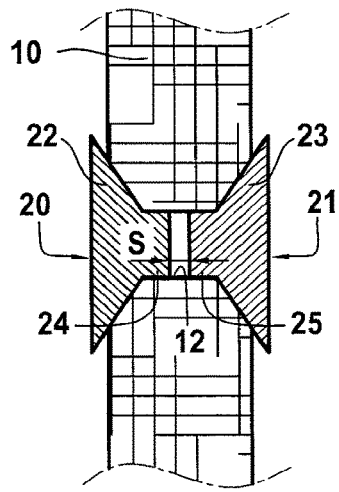
FIGS. 3A to 3E are section views showing the various steps of a method in an implementation of the invention.

As shown in FIG. 3A, a first plug 20 and a second plug 21 are inserted in the hole 12 in the main body 10 (initial hole in the main body). The plugs 20 and 21 may be inserted into the hole 12 simultaneously, or successively.

In this example, the first and second plugs 20 and 21 are identical, but they could be different. In the present implementation, the first plug 20 has a substantially frustoconical portion 22 and a substantially cylindrical portion 24. In this example, the substantially frustoconical portion 22 matches the shape of the flared end 14 of the hole 12. The substantially cylindrical portion 24 extends from the small end of the substantially frustoconical portion 22.

In the present implementation, the plugs 20 and 21 are made of a material having mechanical characteristics that are of the same order of magnitude as the characteristics of the material forming the main body 10. For example, for a main body made of composite material, made up of a preform, e.g. a woven preform, embedded in a matrix, the plugs 20 and 21 may be made of the matrix material or of a composite material having a reinforced matrix. For example, the preform may be made of carbon fibers. For example, the matrix may be made of resin, such as epoxy resin.

The two plugs are separated by a space (S). Thus, the respective substantially cylindrical portions 24 and 25 of the first and second plugs 20 and 21 face each other in the hole 12. Nevertheless, the first and second plugs are not in contact with each other. The size of the space S may be determined in particular as a function of the thermomechanical characteristics of the plugs 20, 21 and of the main body 10. For example, the size of the space S may be determined so that in the event of differential expansion between the main body 10 and the plugs 20, 21, the plugs never come into contact with each other. This could lead to a space appearing between one of the plugs and the end 14 in which it is inserted, thereby initiating unplugging of the old hole 12.

In the present implementation, the plugs 20, 21 are merely inserted in the hole 12, where they are held by friction. In a variant, the plugs could be adhesively bonded in the hole 12, or they could be fastened in any other way.

Figure 3B:
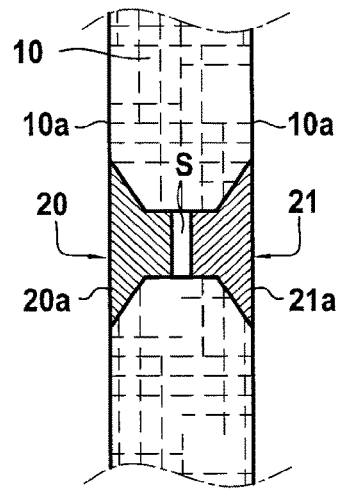

As shown in FIG. 3B, each plug 20, 21 is leveled so that its outside surface 20a, 21a is flush with the surface 10a of the main body in which it lies. Nevertheless, it is clear to the person skilled in the art that the situation shown in FIG. 3B can be obtained by other means, e.g. by cutting the plugs 20, 21 to the desired length before inserting them in the hole 12 in the main body, or indeed by fabricating plugs having exactly the right shape (e.g. by molding or by overmolding directly in the initial hole 12).

Figure 3C:
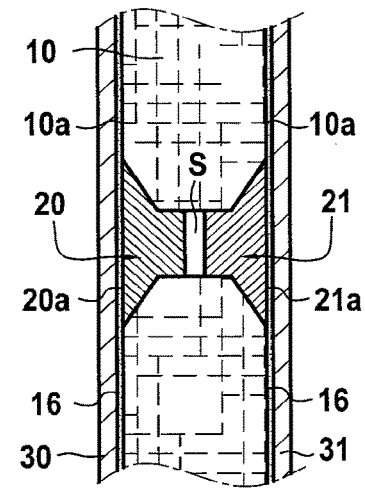

As shown in FIG. 3C, first and second new reinforcements 30 and 31 are fastened on the main body 10. In certain embodiments, the first and second new reinforcements 30 and 31 actually comprise a single piece, like the old reinforcement 130; under such circumstances, the single piece formed by the first and second new reinforcements 30 and 31 may surround a portion of the main body 10 so that the first and second new reinforcements 30 and 31 lie on both sides of the main body 10.

In the present implementation, the first and second new reinforcements 30 and 31 are fastened by means of a layer of adhesive 16 arranged between said new reinforcements and the main body 10. Furthermore, the first new reinforcement 30 covers at least the first plug 20. In other words, the outside surface 20a of the first plug 20 is covered by the first new reinforcement 30. Likewise, the second new reinforcement 31 covers at least the second plug 21. The outside surface 21a of the second plug 21 is covered by the second new reinforcement 31.

The above steps are described in a certain order that is particularly advantageous when the two new reinforcements 30 and 31 are two portions of a single piece that is to surround the main body 10, at least in part. Nevertheless, it is possible to execute the above-described steps in other orders. For example, it is possible to position (and level off, where necessary) the first plug 20 and then fasten the first new reinforcement 30, and only subsequently to position the second plug 21 (and level it off, where necessary) and fasten the second reinforcement 31. The person skilled in the art can readily determine all realistic variations of order in the execution of these steps.

Figure 3D:
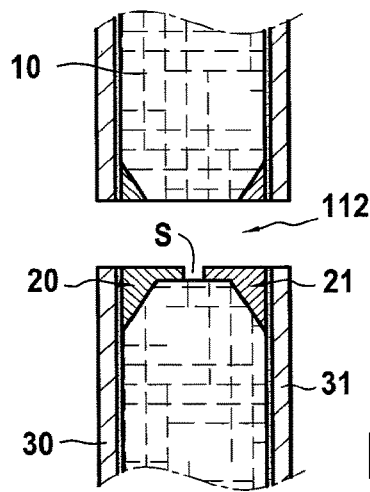

The method of the present implementation further comprises arranging a new through hole passing through the new reinforcement and at least a portion of the main body. As shown in FIG. 3D, in this example a common new hole 112 is formed passing through the first new reinforcement 30 and the second new reinforcement 31 and also the main body 10.

Because of the difficulty in locating the initial hole 12 and in forming a new hole 112 in exactly the same location, the new hole 112 may be off-center relative to the initial hole 12. This leads to the plugs 20 and 21 often being pierced by the hole 112 in a manner that is not axially symmetrical, as shown in FIG. 3D.

Figure 3E:
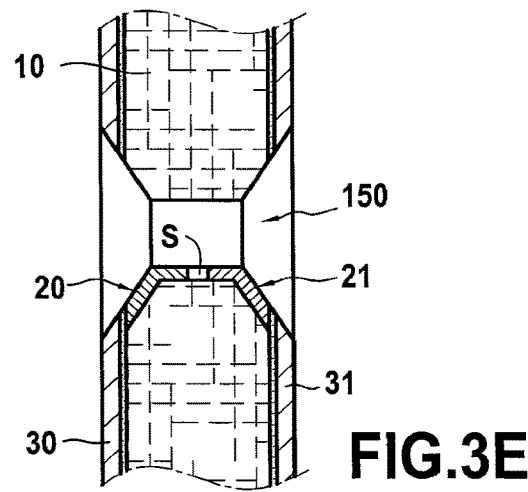

In an optional subsequent step (not shown), the ends of the new hole 112 may be flared, in particular by countersinking. By way of example, such flaring may be provided for the purpose of receiving a rivet, as shown in FIG. 3E. In this figure, a rivet 150 fills the hole 112 and contributes to holding the new reinforcements 30 and 31 on the main body 10.

As shown in FIG. 3E, the remaining portions of the plugs 20 and 21 are to be found at the periphery of the rivet 150, between the rivet 150 and the main body 10. In this respect, the plugs 20 and 21 form a kind of bushing for the rivet 150, independently of any bushing (not shown) that the rivet 150 might also contain. Apart from at the space S, the plugs 20 and 21 fill any space that might exist between the rivet 150 and the main body 10, thereby enabling the rivet 150 to be wedged sufficiently and to perform its retention function appropriately.

Furthermore, the remaining portions of the plugs 20 and 21 are blocked on either side by the new reinforcements 30 and 31. The space S enables the plugs 20, 21 to expand relative to the main body 10 without that causing them to exert a large amount of force on the new piece of reinforcement 30 and 31.

Although the first implementation described above makes use of two plugs, the invention applies in analogous manner to a situation involving only one plug and only one reinforcement, or to a situation involving two plugs and only one new reinforcement.

Although the present invention is described with reference to specific implementations, modifications may be applied to them without going beyond the general ambit of the invention as defined by the claims. In particular, the individual characteristics of the various implementations shown and/or mentioned may be combined in additional implementations. Consequently, the description and the drawings should be considered in a sense that is illustrative rather than restrictive.

The invention claimed is:

1. A repair method for repairing an airfoil element of a turbine engine comprising a main body including composite material and an old reinforcement including metal and covering an end portion of the main body, the airfoil element including an initial hole passing through the old reinforcement and at least a portion of the main body, the method comprising:

removing the old reinforcement;

positioning a first plug in a first end of the initial hole in the main body, and positioning a second plug in a second end of the initial hole, the first plug and the second plug facing each other within the initial hole and being separated by a space therebetween;

leveling the first plug so that an outer surface of the first plug is flush with a first side surface of the main body, and leveling the second plug so that an outer surface of the second plug is flush with a second side surface of the main body;

after leveling the first plug and the second plug, fastening a new reinforcement on the main body, the new reinforcement covering the outer surface of the first plug and the outer surface of the second plug; and forming a new hole passing through the new reinforcement, the first plug, the second plug, and at least a portion of the main body, wherein the new hole is off-center relative to the initial hole, and wherein the space comprises an air gap that is sized to allow free ends of the first and second plugs to expand towards each other, during operation of the turbine engine, without coming into contact.

2. The repair method according to claim 1, wherein prior to fastening the new reinforcement, the first plug is fastened to the main body.

3. A repair method for repairing an assembly comprising a main body, a first old reinforcement and a second old reinforcement, the first and second old reinforcements being arranged on either side of the main body, the assembly including an initial hole passing through the main body and the first and second old reinforcements, the method comprising:

replacing the first old reinforcement and replacing the second old reinforcement using the repair method according to claim 1, wherein the holes are formed in the two new reinforcements in such a manner that the hole in the first new reinforcement and the hole in the second new reinforcement are in communication.

4. The repair method according to claim 1, wherein the initial hole in the main body presents a shape that flares towards the old reinforcement, and the first plug comprises a frustoconical portion.

5. The repair method according to claim 1, wherein the first plug has mechanical properties of the same order of magnitude as the mechanical properties of the main body.

6. The repair method according to claim 1, wherein the new reinforcement is fastened on the main body by a layer of adhesive.

7. The repair method according to claim 1, wherein each of the first plug and the second plug includes a cylindrical portion positioned inside the initial hole, and the new hole is delimited by a remaining portion of the cylindrical portion of the first plug, a remaining portion of the cylindrical portion of the second plug, and the portion of the main body.

8. The repair method according to claim 1, wherein shapes of the first plug and the second plug are the same.

9. The repair method according to claim 8, wherein the first plug and the second plug are frustoconical.

10. The repair method according to claim 3, further comprising riveting the assembly after forming the new hole in the assembly.

* * * * *